(12) United States Patent
Hsu

(10) Patent No.: US 8,192,019 B2
(45) Date of Patent: Jun. 5, 2012

(54) WRAPAROUND CORRECTIVE LENS

(76) Inventor: Roger Wen-Yi Hsu, Rancho Cucamonga, CA (US)

( * ) Notice: Subject to any disclaimer, the term of this patent is extended or adjusted under 35 U.S.C. 154(b) by 169 days.

(21) Appl. No.: 12/815,850

(22) Filed: Jun. 15, 2010

(65) Prior Publication Data
US 2011/0134388 A1   Jun. 9, 2011

Related U.S. Application Data

(60) Provisional application No. 61/267,167, filed on Dec. 7, 2009.

(51) Int. Cl.
*G02C 7/02* (2006.01)

(52) U.S. Cl. ............ 351/159.7; 351/159.01; 351/159.78

(58) Field of Classification Search .................. 351/159, 351/168–172, 177, 159.01, 159.41–159.49, 351/159.7, 159.78
See application file for complete search history.

(56) References Cited

U.S. PATENT DOCUMENTS

| 6,264,327 | B1 * | 7/2001 | Copeland | 351/163 |
| 7,014,315 | B2 * | 3/2006 | Iori et al. | 351/159 |
| 2008/0055541 | A1 * | 3/2008 | Coulter et al. | 351/169 |

FOREIGN PATENT DOCUMENTS

GB   1509583   *  5/1978   ................ 351/159

* cited by examiner

*Primary Examiner* — Darryl J Collins
(74) *Attorney, Agent, or Firm* — Alexander Chen, Esq.

(57) ABSTRACT

A corrective wraparound lens is provided for a wearer where the wraparound lens has a non-corrective lens element and a corrective lens element where the curvature of the non-corrective lens element is different from the curvature of the corrective lens element. Such lens has the ability to correct the defect in eyesight while capable of contouring to the face of the wearer thus able to protect the face of the wearer. In addition, a method to correct defect in eye is provided using a corrective wraparound lens for a wearer comprising a non-corrective lens element and a corrective lens element wherein a first curvature of said non-corrective lens element is different than a second curvature of said corrective lens element.

4 Claims, 4 Drawing Sheets

WRAPAROUND CORRECTIVE LENS

CROSS-REFERENCE TO RELATED APPLICATIONS

This application claims the benefit of priority under 35 U.S.C. 119(e) to the filing date of U.S. provisional patent application No. 61/267,167 entitled "Twin Bifocal Corrective Lens Elements" which was filed Dec. 7, 2009, and is incorporated herein by reference.

FIELD OF THE INVENTION

The present invention relates to corrective lens elements embedded in surrounding non-corrective lens intended for use in a wraparound type sun shield spectacle lens to be mounted in a wraparound type frame.

BACKGROUND OF THE INVENTION

Wraparound type frames have increased in popularity, especially as sports and fashion sunglasses. Conventional glasses protect the eyes from dust, ambient light, UV rays, direct light, and glare from the front only. Wraparound glasses have the advantage of multiple angle eye protection from these elements, and preventing UV rays from entering around the frame. Therefore, spectacle frames of the wraparound type ("wraparounds") are especially useful in applications in the athletic fields for safety, general eye protection, and fashion.

Moreover, demand for wraparounds extends beyond athletic and safety fields. Incorporation of corrective lens elements into the wraparound lens allows for more general use of wraparounds in daily life; thus, enabling a wearer to smoothly transition from athletic scenarios requiring the multiple protections afforded by the wraparound design to mundane living scenarios, but also benefiting the wearer in athletic scenarios with enhanced vision thanks to prescription corrective lens elements.

It is known in prior art to manufacture non-corrective eyeglasses with wrap-around segments to shield the eye from elemental interference in the temporal visual field of the wearer.

It is also known in prior art to manufacture sunglasses or protective eyeglasses with spectacle lenses with refractive power.

Previous attempts to attach sunglass or sunshield elements to corrective eyeglasses or to wear sunglasses or sunshields over, in front of, or behind corrective eyeglasses are cosmetically unappealing, uncomfortable to the wearer, and impractical for use in casual, athletic, or safety-necessitated settings. Many conventional Prescription lenses have relatively flat base curves and thus limit the field of view due to physical size limitations and/or peripheral distortion.

It is accordingly an object of the present invention to overcome the difficulties and deficiencies related to prior art.

Under the present situation, the prescriptive corrective lens elements are embedded into the viewing region of either eye of a non-corrective lens for mounting in a wraparound frame to provide wider fields of view and greater eye protection yet offering corrective lens capabilities.

In early ophthalmic research, steeply curved prescription lenses were used at the detriment of eye protection and larger visual field. Tscherning's ellipse was found to be the relationship between curvature and through power, and identifies lens curvature and lens power combinations which minimize aberrations. Tscherning's ellipse assumes normal values for the index of refraction, lens thickness, and vertex distance parameters of a lens. Furthermore, Tscherning's ellipse retains values of ellipsoid shape and inclined orientation for certain lens parameters while the exact ellipse points may change.

The lower portion of the ellipse is the Ostwalt section, which describes flat front surfaces for ophthalmic prescription lenses. The upper part of the curve is the Wollaston section, which is a more steeply curved lens and has been unpopular historically. Such lenses were cosmetically unappealing and limiting in view.

Modern lenses have been manufactured with steeply curved spherical surfaces to serve various needs, such as natural lens replacement in the eye. Presently, most conventional prescription lenses are relatively flat, Ostwalt section, single vision miniscus lenses glazed into flat spectacle frames. Ostwalt sections are often treated with various processes to gain anti-reflective and/or reflective properties.

Corrective lenses are typically prescribed in various quarter-diopter strengths. Each power specification includes a spherical correction in diopters. Convergent powers condense light to correct for hyperopia, while divergent powers spread out light to correct for myopia.

For persons with astigmatism, two different correction powers in two different meridians are required which is described by the difference between cylinder and sphere power.

The axis component defines the location of sphere and cylinder powers, as the sphere is normally 90 degrees from the cylinder.

Hyperopia may be corrected with magnifying lenses. Presbyopia may be corrected with specific prism and base curve values.

Corrective lens elements can be produced in many different shapes, and the most common is ophthalmic or convex-concave. In the convex-concave lens, both front and back surfaces have a positive radius. This results in a positive convergent front surface and a negative divergent back surface. The corrective power of the convex-concave lens derives from the curvature difference between the front and rear surfaces.

The base curve, determined from the shape of the front surface of an ophthalmic lens, may be changed to suit optic and cosmetic characteristics across the entire lens surface.

Lenses are classified according to a refractive index; higher indexes conferring the advantage of thinner and lighter lenses, minimal edge thickness, and reduced internal reflections but at the cost of increased chromatic aberration, poorer light transmission, increased back and inner surface reflections, and degrading off-axis optical quality.

Optical quality of a lens is measured by dispersion, where lower dispersion measurement results in chromatic aberration. Dispersion is measured by an Abbe number (ABBE). In practice, ABBE's effect on chromatic aberration changes about 1:1, such that a small change in ABBE of about two units will not likely be noticed or beneficial but a change of about 17 unites may be beneficial for users with strong prescriptions that move their eyes and look away from the optical center of the lens. Since the human eye moves to keep the visual axis close to its achromatic axis, which is free of dispersion, and is insensitive to color in the periphery, the eye's ABBE number is independent of importance of the ABBE of the corrective lens. As the eye shifts its gaze, it moves to look through different parts of a corrective lens, which can be short distances away from the optical center. Thus, wearers who are sensitive to chromatic aberrations and have stronger corrective lens prescriptions and also look off the lens's optical center often should use lens material with the highest possible ABBE value at an acceptable thickness.

Power error is the change in lens optical power as the eye looks through different points on the lens area. It is least present at the optic center and worsens towards the lens edges. Power error is dependent on prescription strength and optimal spherical and aspherical form of the lens.

As the eye shifts from looking through the optical center of the corrective lens, the measured lens-induced astigmatism increases. Such increases impact visual peripheral clarity especially in spherical lenses with strong correction and legs-spherical base curve.

Distortion normally increases as corrective power increases. To combat lens induced power error, the best spherical form is selected for the lens.

Materials used in the manufacture of the corrective lens may consist of optical crown glass, plastic (CR-39), Trivex trivex, polycarbonate, and polyurethanes (high-index plastics), each possessing different values for refractive index, Abbe values, density, and UV cutoff.

The lens may be coated for antireflective, ultraviolet protective, and scratch resistant properties. Anti-reflective coatings make the eye behind the lens more visible, lessen back reflections of the white of the eyes, and bright objects behind the wearer, thus increasing the contrast of environmental surroundings as well as reducing light glare in night vision. UV coating may be used to reduce ultraviolet spectrum light wave transmission, thus decreasing retinal damage and the likelihood of cataracts during wear.

The above considerations are taken and applied to the present invention, thus creating a highly improved, cosmetically-appealing, and functional piece of eyewear for a multitude of activities and range of uses.

OBJECT OF THE INVENTION

Objectives of the present invention include the provision of ophthalmic lens elements with good vision properties, steep base curve spectacle lenses that are readily manufactured and dispensed, and a wide unobstructed field of view with adequate eye and temporal protection. Further objectives of the present invention include the provision of steeply curved lens elements in common power and astigmatism prescriptions, consistent spectacle lens and frame form and appearance, cosmetically-appealing three-dimensionally curved lens edges, edge thicknesses, and spectacle rims, and good peripheral vision properties in various prescriptions. It is further an object of the invention to provide corrective lens for wraparound use where the lens can be manufactured in mass scale to reduce cost.

SUMMARY OF THE INVENTION

The invention has been devised in view of the circumstances and it is the object of the invention, among others, to provide a wraparound type lens with corrective lens elements incorporated in the normal line of sight in the spectacle lens for each eye of the wearer.

A broad object of the present invention is to provide ophthalmic lenses with good vision properties in the context of casual, athletic, and safety wear and to provide a wide and unobstructed field of view. It is another object of the present invention to provide a steeply curved lens, affording common power and astigmatism prescriptions, with corrective lens elements in the immediate field of view and an overall spectacle design affording effective eye, nose bridge, and temple safety protection.

In order to attain the above-identified and other objects of the invention, one embodiment of the invention provides a spectacle lens that is designed for use in and most suitably mounted in a spectacle frame with a camber angle of 200 degrees or more. In order to address astigmatic aberration and prismatic effect caused in the spectacle lens that is oblique in the horizontal direction with regard to line of sight, prismatic and cylindrical power are added to the refractive surface on the object side or refractive surface on the eye side. The lens further includes prismatic power to offset a camber angle, which is provided at a defined reference point. The spectacle lens shields the eye, nose, and temple regions of the face in a flush and continuous fashion.

Furthermore, corrective lens elements are embedded in the spectacle lens in the zone of vision of each eye. To integrate the corrective lens element into the spectacle, the spectacle lens is steeply curved, while the corrective lens element is perpendicular to the line of sight of the human eyes. As a result, a lens with multi-curvature elements is designed. The wrap around corrective lens is steeply angled to taper to the eye wearer's contour while the mid section of the lens runs closer to perpendicular to the line of sight of the wearer.

Advantages of the design and construction of this invention involve the provision of novel sun lenses and protective eyewear with specific anti-reflective or polarized properties and embedded corrective lens elements in desired cosmetic configurations.

In one embodiment, a corrective wraparound lens for a wearer comprising a non-corrective lens element and a corrective lens element wherein a first curvature of said non-corrective lens element is different than a second curvature of said corrective lens element. In one embodiment, corrective lens element is located between said non-corrective lens element. In one embodiment, the first curvature of said non-corrective lens element is contoured to a face of said wearer. In one embodiment, the second curvature of said corrective lens element is approximately perpendicular to the eyesight of said user when said user's eyesight parallels to the direction to which said user faces. The corrective lens element can be selected from the group consisting of biconvex lens, pland convex lens, convex-concave lens, meniscus lens, plano-concave lens and bioconcave lens.

In one embodiment, the corrective lens element contains bifocal elements. In other embodiment, the corrective lens element comprises a back surface and a front surface, wherein said back surface includes a base curvature of between 5 to 15 degrees. In yet another embodiment, the corrective lens element comprises a back surface and a front surface, wherein said front surface includes a base curvature of between 3 to 12 degrees.

In one other embodiment, the corrective wraparound lens is made using materials selected from the group consisting of optical crown glass, plastic (CR-39), TRIVEX Trivex, polycarbonate, polyurethane. In one other embodiment, the wraparound lens is polarized. In yet another embodiment, the corrective wraparound lens is coated with with coating selected from the group consisting of anti-reflective coating, ultraviolet protection coating, scratch resistant coating, mirror coating, light control tint, and light control coating.

In another aspect of the invention a method of treat defects of eyes utilizing a corrective wraparound lens for a wearer comprising a non-corrective lens element and a corrective lens element wherein a first curvature of said non-corrective lens element is different than a second curvature of said corrective lens element. In one embodiment, the defects is selected from a group consisting of myophia, hyperopia, astigmatism, and presbyopia. In one other embodiment, the corrective lens element is located between said non-corrective lens element. In yet another embodiment, the curvature of said non-corrective lens element is contoured to a face of said wearer. In one embodiment, the curvature of said corrective lens element is approximately perpendicular to the eyesight of said user when said user's eyesight parallels to the direction to which said user faces.

These and other objects and advantages will be apparent from the following text and drawings.

DETAILED DESCRIPTION OF THE EMBODIMENTS

Figure 1:
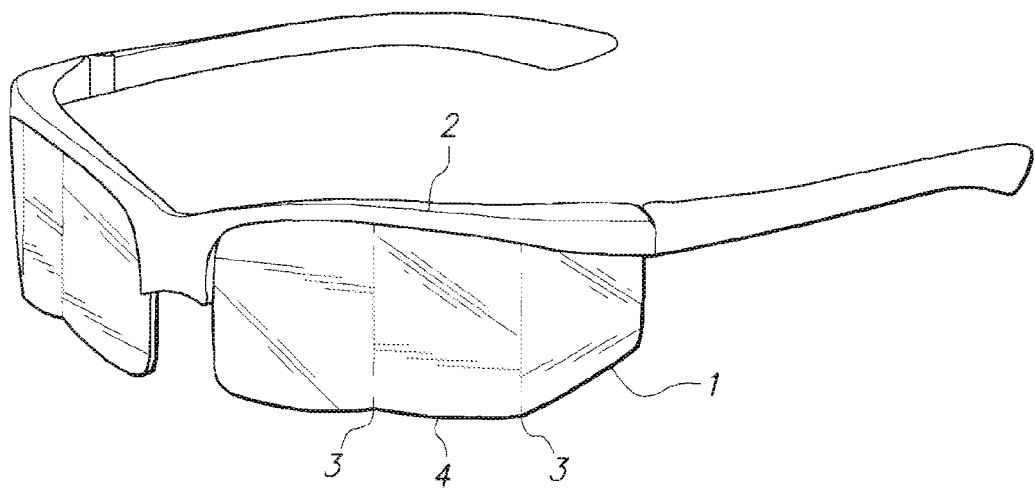
FIG. 1 is an oblique perspective view of a spectacle frame of the wraparound type having a lens according to an embodiment of the invention.

Referring to FIG. 1 which is a perspective view of the eyewear in one embodiment, including corrective wraparound lens 1 and spectacle frame 2 of the present invention. The lens shape creates a functionally and cosmetically appealing object. The curvature of the front lens is reflected as multi-level. The non-corrective lens portion 3 is reflected in one curvature while the corrective lens portion 4 reflects another curvature.

Figure 2:
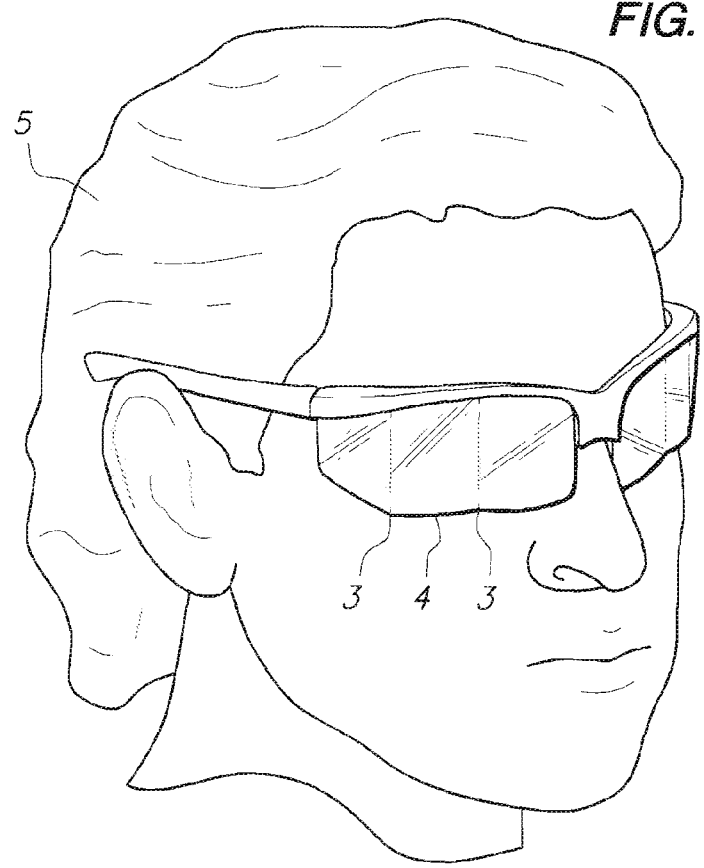
FIG. 2 illustrates various aspects of the appearance, edging, and glazing of lens elements of the present invention and spectacle frames for mounting therewith.

Now referring to FIG. 2. FIG. 2 is a side view of the eyewear of FIG. 1 on the face of the user 5. The non-corrective lens portion 3 is visible in its steep curvature while the corrective lens 4 is visible in the relative flat curvature which would be close to perpendicular to the eyesight of the wearer. The figure illustrates the visual appearance of the eyewear on the face of the user 5. The figure also illustrates that the lens is of relatively large size to provide enhanced eye protection and increased facial protection from the elements.

Figure 3:
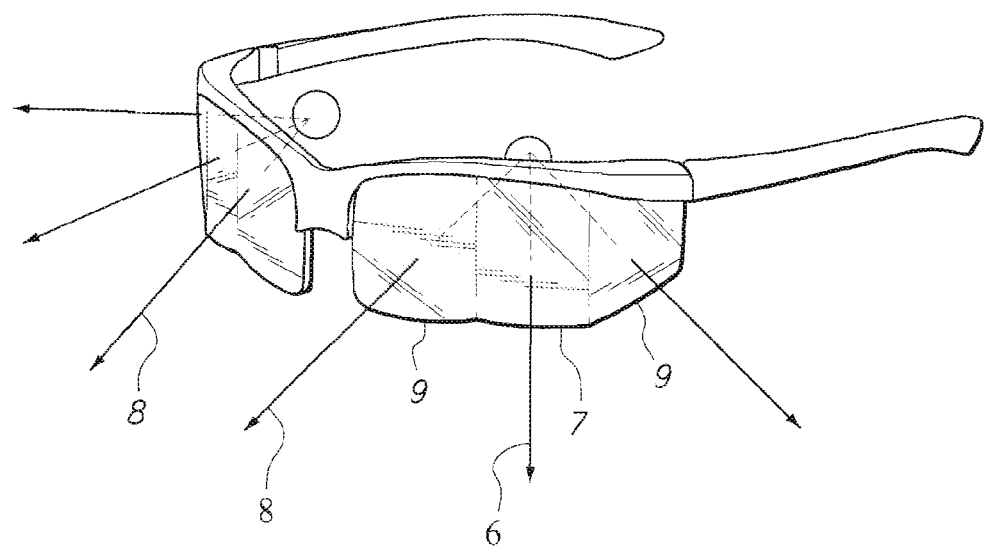
FIG. 3 illustrates the field of vision through an embodiment of the invention through the corrective lens element and throughout the non-corrective remaining lens element.

Now referring to FIG. 3. FIG. 3 illustrates the field of vision through an embodiment of the invention. Vision through the normal line of sight 6 is focused by the corrective lens elements 7 embedded in the forward line of sight of each eye of the wearer. Vision outside of the directly forward line of sight 8 is not corrected, as the surrounding lens 9 is non-corrective lens.

Figure 4A:
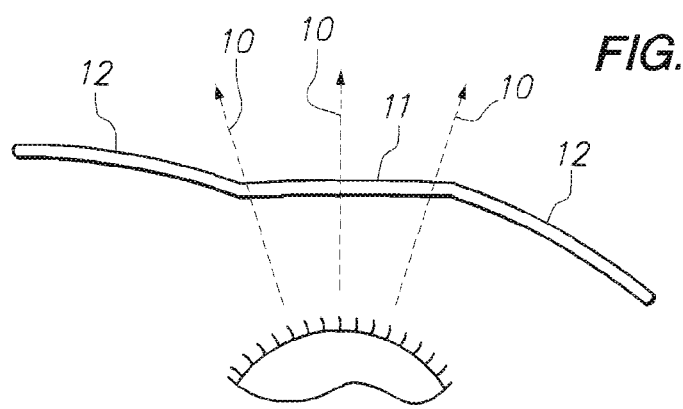
FIG. 4(a) and FIG. 4(b) illustrate the view from the top to which the field of vision is disclosed through an embodiment of the invention, both through the corrective lens element of an embodiment of the present invention and throughout the typical wraparound lens.
Figure 4B:
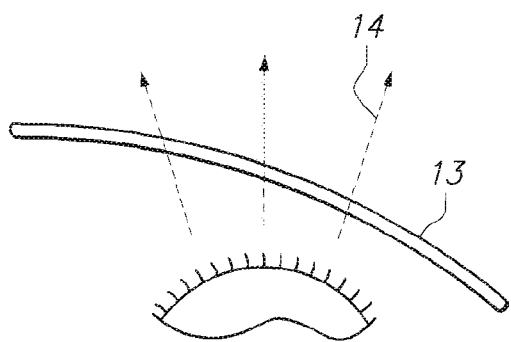

Next we refer to FIG. 4(a) and FIG. 4(b). In FIG. 4(a), this is a view from the top of the corrective wraparound lens as compared to typical wraparound lens in FIG. 4(b) illustrating the direct line of sight 10 through the corrective lens element 11 embedded in the full lens and the relative angles of the non-corrective lens element 12 in relation to the corrective lens element. Here, FIG. 4(a) illustrates that very concept of this invention. Here, the multi-level curvature lens design is clearly illustrated. This corrective wraparound lens is able to offer the ability to curve to taper to the contour of the surface of the wearer and offer the ability to correct vision. In FIG. 4(b), this is a view from the top of a typical wraparound lens 13 illustrating the direct line of sight 14 through the wraparound lens 13.

Figure 5:
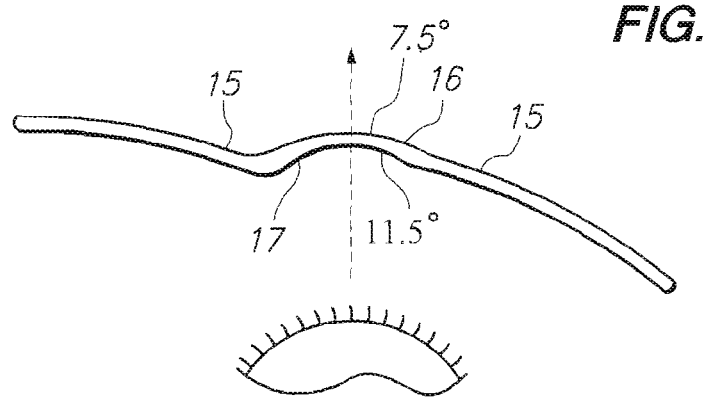
FIG. 5 illustrates the view from the top indicating an embodiment of the invention where the corrective lens element utilizes a convex-concave lens.

Next we refer to FIG. 5. In FIG. 5, this is a view from the top of the corrective wraparound lens in on of the embodiments where the corrective lens portion 15 bearing a 7.5 degree in curvature angle for the front surface 16 and the back surface 17 curvature angle is shown to be 11.5 degrees. This is a typical myopia corrective lens setup sporting a convex-concave lens where the concave surface has higher in curvature angle than its convex surface.

Figure 6:
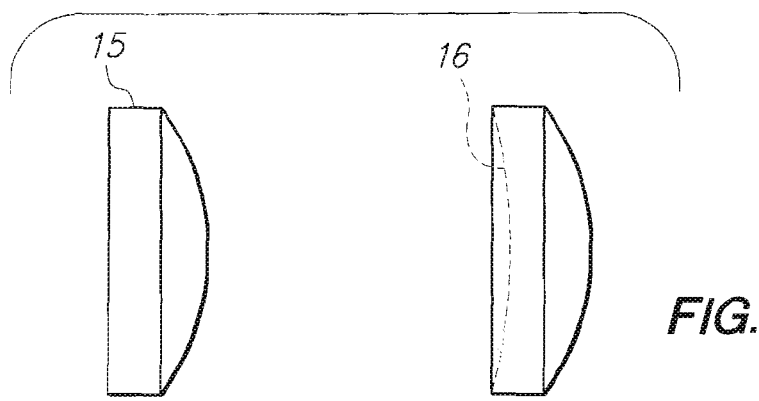
FIG. 6 illustrates how a typical blank lens is shaped to achieve corrective power FIG. 7 also illustrate how a typical blank lens is shaped to achieve corrective power
Figure 7:
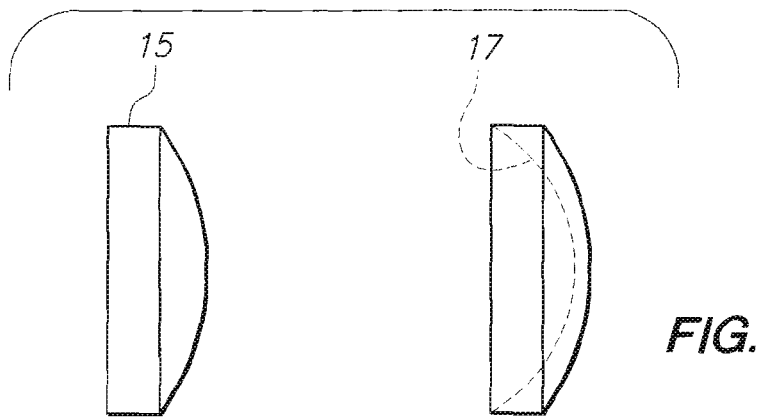

Next we refer to FIGS. 6 and 7. Here the figures explains how corrective lens are typically made. In the lab the patient's full prescription gives these exact details: a) The total power (in diopters) the finished lens must have, 2) The strength and size of the segment (if needed), 3) The power and orientation of any cylinder curves, 4) Details such as the location of the optical center and any induced prism that may be needed. The lab technician selects a lens blank that has the correct segment (called an add) and a base curve that is close to the prescribed power. Then to make the power match the prescription exactly, another curve is ground on the back of the lens blank. In most labs the equipment is designed to grind minus curves, so a strong, plus lens blank is usually selected. If the base curve is too strong, then a minus curve is ground in the back of the lens, which reduces the total power of the lens. So for example, referring to FIG. 6, a very common lens blank 15 is +6.00 diopters. If the prescription calls for a total of +2.00 diopters, a −4.00 diopter curve 16 is ground on the back resulting (+6.00 D)+(−4.00 D)=+2.00 D. If the prescription calls for a minus lens, referring to FIG. 7, the +6.00 diopter lens blank 15, can still be used. To create a lens with the strength of −2.00 diopters, a −8.00 diopter curve 17 is ground on the back, resulting (+6.00 D)+(−8.00 D)=−2.00 D.

Figure 8:
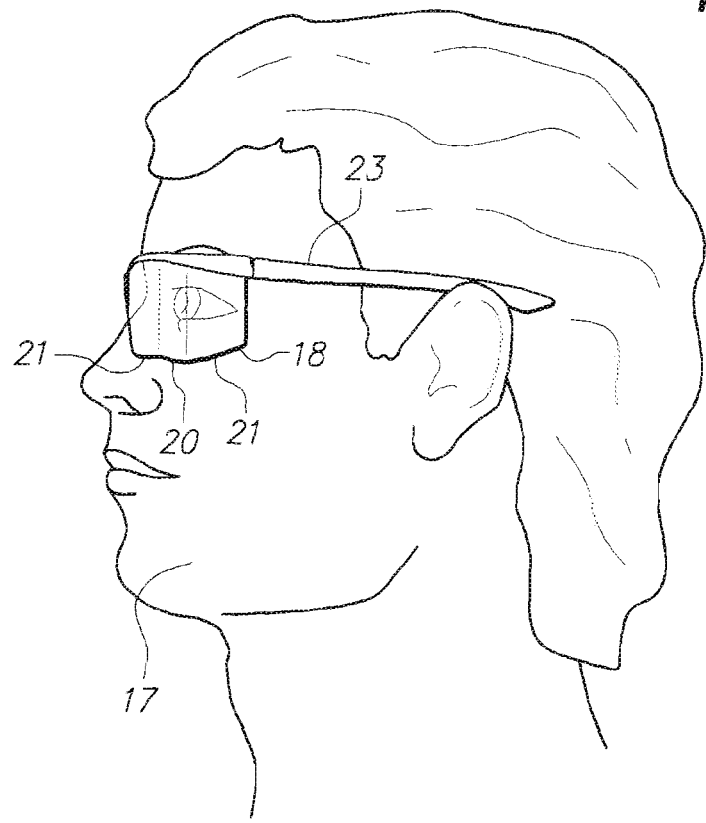
FIG. 8 illustrates how the present invention can utilize different lens format to achieve corrective power.

Next we refer to FIG. 8. FIG. 8 is a side elevation of the eyewear on the face of the wearer. The figure illustrates the relative size of the corrective wraparound lens 18 to the face 19 of the wearer. The figure also illustrates the curvature of the lens reflecting the corrective lens element 20 and the non-corrective lens element 21. In this embodiment, the figure further illustrates the seamless flush joint between the temporal piece 23 and corrective wraparound lens 18.

Figure 9:
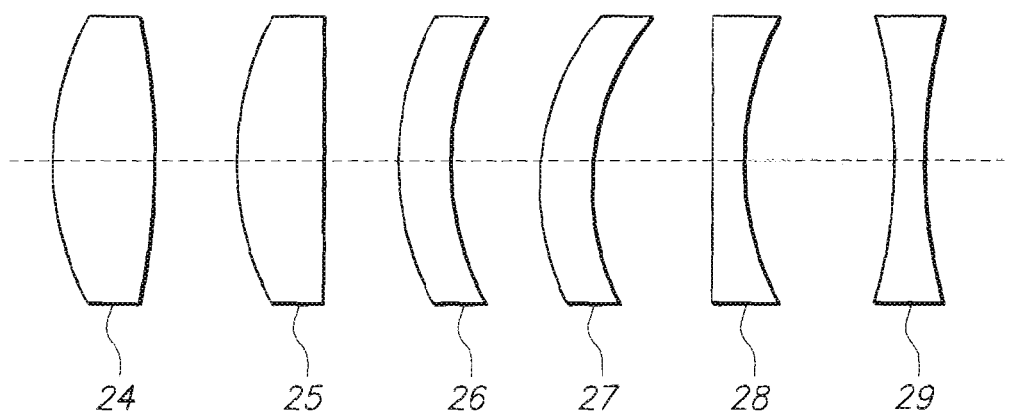

Now referring to FIG. 9. FIG. 9 illustrates an array of lens options for the corrective lens element from Biconvex 24, Plandconvex 25, Convex-Concave 26, Meniscus 27, Plano-Concave 28, to Bioconcave 29.

What is claimed is:

1. A corrective wraparound lens for a wearer comprising a non-corrective lens element and a corrective lens element wherein a first curvature of said non-corrective lens element is different than a second curvature of said corrective lens element wherein said corrective lens element comprises a back surface and a front surface wherein said back surface includes a base curvature of between 5 to 15 degrees.

2. The corrective wraparound lens according to claim 1, wherein said corrective lens element comprises a back surface and a front surface, wherein said front surface includes a base curvature of between 3 to 12 degrees.

3. A method of treat defects of eyes utilizing a corrective wraparound lens for a wearer comprising a non-corrective lens element and a corrective lens element wherein a first curvature of said non-corrective lens element is different than a second curvature of said corrective lens element wherein said corrective lens element comprises a back surface and a front surface, wherein said back surface includes a base curvature of between 5 to 15 degrees.

4. The method according to claim 3, wherein said corrective lens element comprises a back surface and a front surface, wherein said front surface includes a base curvature of between 3 to 12 degrees.

* * * * *